May 20, 1947. G. A. BIGGS 2,420,853
HYDRAULIC TURBINE
Filed May 29, 1944 3 Sheets-Sheet 1
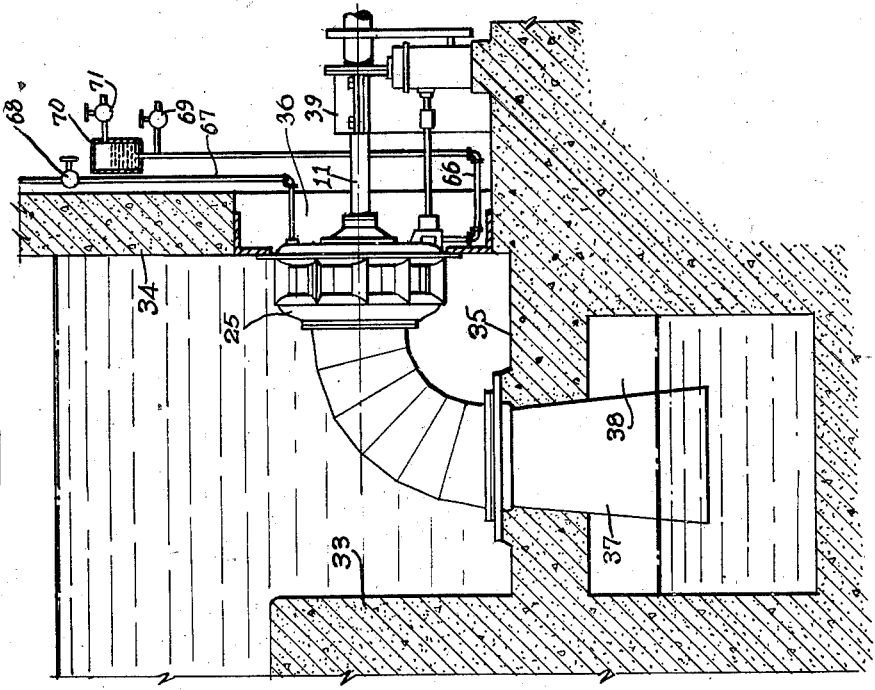
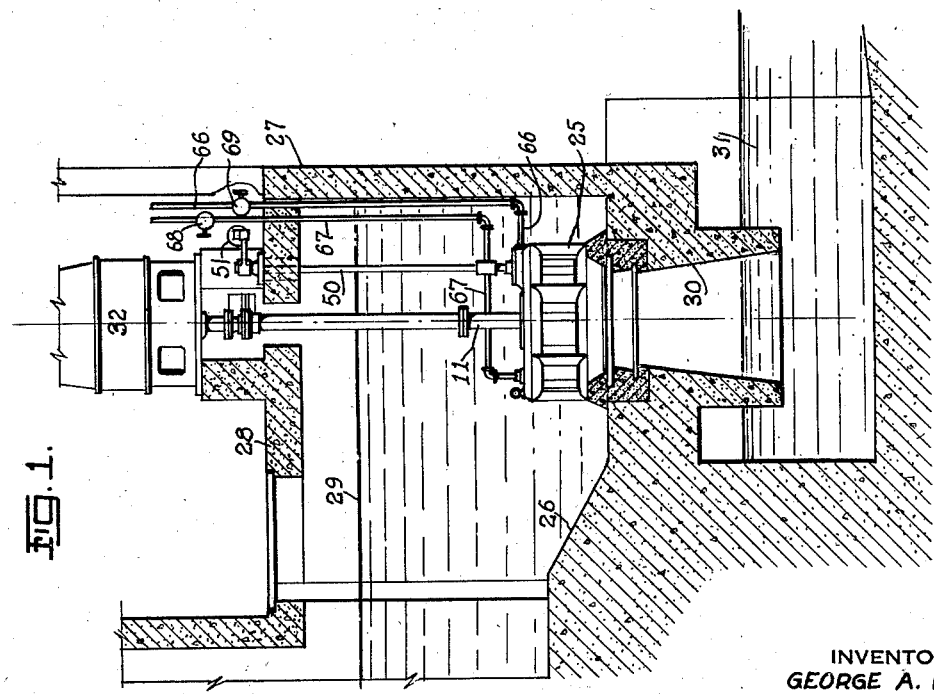
INVENTOR
GEORGE A. BIGGS
BY
Toulmin & Toulmin
ATTORNEYS May 20, 1947. G. A. BIGGS 2,420,853
HYDRAULIC TURBINE
Filed May 29, 1944 3 Sheets-Sheet 2

INVENTOR
GEORGE A. BIGGS
BY
*Toulmin & Toulmin*
ATTORNEYS

May 20, 1947.　　　　G. A. BIGGS　　　　2,420,853
HYDRAULIC TURBINE
Filed May 29, 1944　　　　3 Sheets-Sheet 3
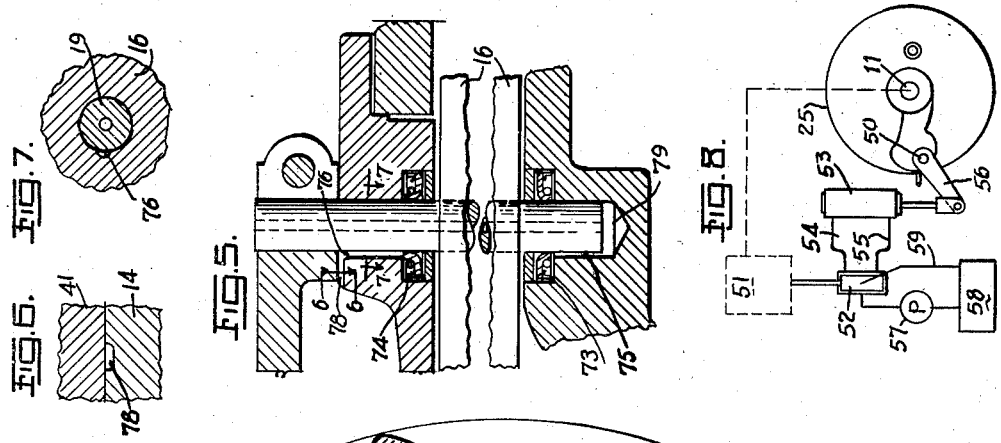
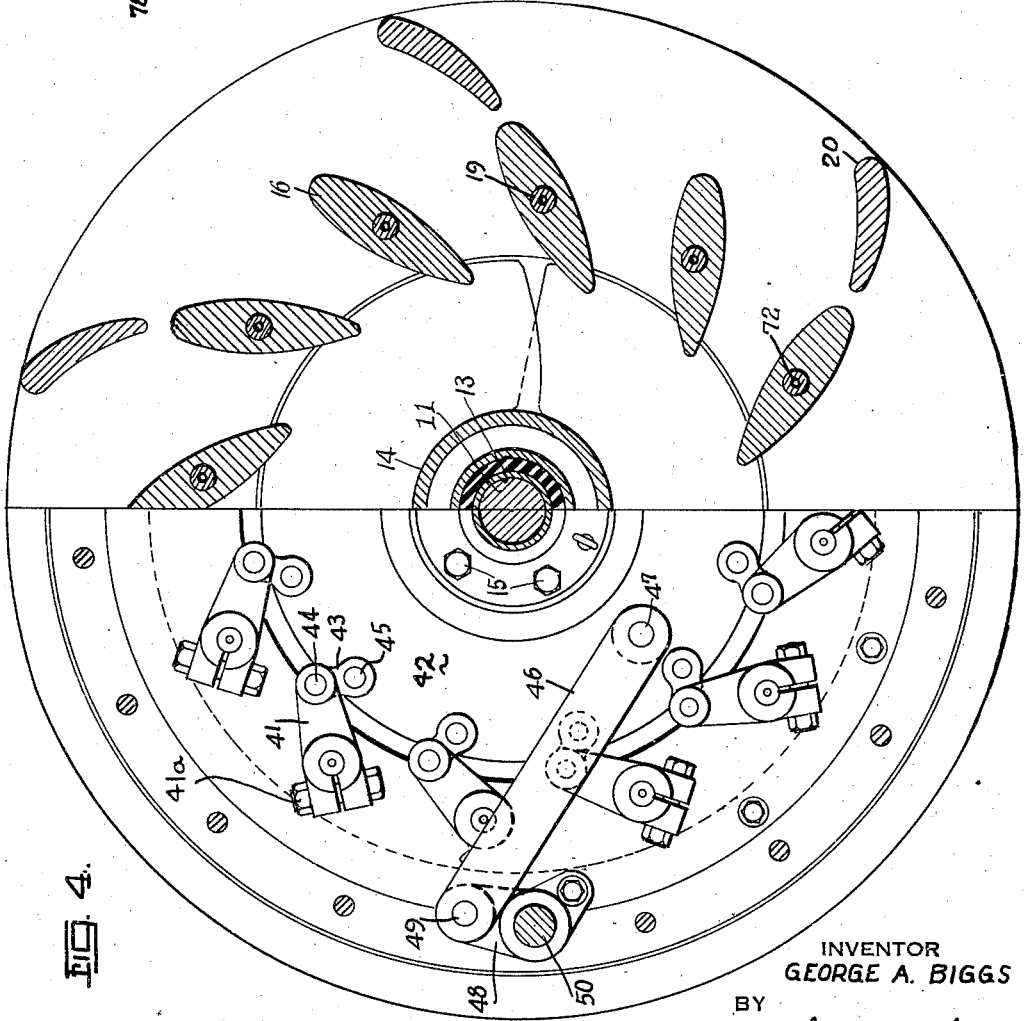
INVENTOR
GEORGE A. BIGGS
BY
Toulmin & Toulmin
ATTORNEYS Patented May 20, 1947

2,420,853

UNITED STATES PATENT OFFICE 2,420,853

HYDRAULIC TURBINE

George A. Biggs, Springfield, Ohio, assignor to The James Leffel & Co., Springfield, Ohio, a corporation of Ohio Application May 29, 1944, Serial No. 537,813

11 Claims. (Cl. 253—122)

This invention relates to hydraulic turbines of either the vertical or horizontal type that are adapted for use with either open or closed flumes.

An object of the invention is to provide a hydraulic turbine structure wherein a constant supply of lubrication is provided for the turbine gate operating the mechanism, and which seals the turbine gate operating mechanism from the influence of the water surrounding the turbine.

Still another object of the invention is to provide a hydraulic turbine wherein the gate operating mechanism may be more accurately controlled to maintain constant speed of rotation of the turbine over varying load conditions by providing constant lubrication for the working parts of the turbine gate operating mechanism to thereby permit the use of less clearance in the bearings of the various members of the gate mechanism so as to reduce lost motion and thereby provide the more accurate regulation of the speed of rotation of the turbine.

Still another object of the invention is to provide a hydraulic turbine wherein the gate operating mechanism is sealed from the influence of the water surrounding the turbine, and means is provided for readily lubricating, or adding lubricant to, the chamber in which the turbine gate operating mechanism is placed without necessitating lowering of the water level in the flume.

Still another object of the invention is to provide a hydraulic turbine wherein the gate operating mechanism of the turbine is lubricated by lubricant retained under pressure.

Still another object of the invention is to provide a hydraulic turbine in accordance with the foregoing object wherein the lubricant under pressure used for lubricating the working parts of the gate operating mechanism is also used to balance, or at least partially balance, the force applied upon the gates by the water entering the turbine.

Further objects and advantages will become apparent from the drawings and the following description.

In the drawings:

Figure 1 is a cross-sectional view showing a turbine, incorporating features of this invention, mounted in an open flume wherein the head of water is relatively shallow.

Figure 2 is a cross-sectional view showing a turbine, incorporating features of this invention, mounted horizontally in an open flume wherein the head of water can vary over a considerably wide range.

Figure 4 is a horizontal cross-sectional view of the turbine taken substantially along line 4—4 of Figure 3.

Figure 5 is an enlarged partial cross-sectional view of the support shaft for the gates of the hydraulic turbine.

Figure 6 is an enlarged cross-sectional view taken along line 6—6 of Figure 5 showing a lubricant passage for conducting lubricant adjacent the support shaft for a gate of the hydraulic turbine.

Figure 7 is a cross-sectional view taken along line 7—7 of Figure 5 also indicating the location of a lubricant passage along the support shaft for a gate of the turbine for the purpose of balancing the force of the water upon the gate.

Figure 8 is a diagrammatic view of a speed control for the turbine.

Figure 3:
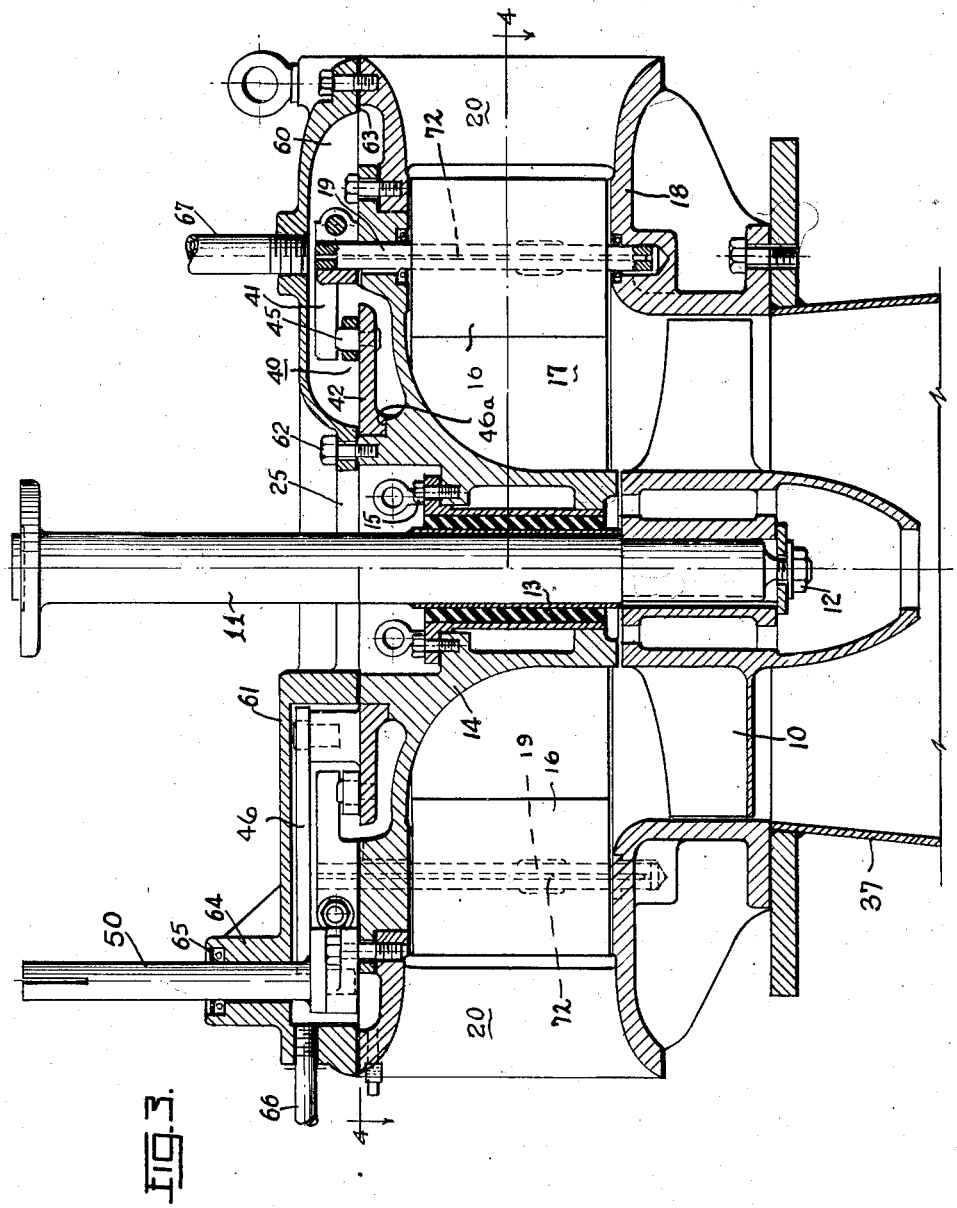
Figure 3 is a critical cross-sectional view through the hydraulic turbine of this invention.

In the manufacture and use of hydraulic turbines, the use of gates to control the flow of water into the runner of the turbine is conventional practice, but the usual practice has also been to merely leave the operating mechanism for the gates of the turbine open and exposed to the action of the water surrounding the turbine. No special effort has been made to maintain lubricant constantly around the operating mechanism for the gates of the turbine, or where such lubrication has been attempted, no sealing or protective means has been provided to prevent the escape of the lubricant or prevent it from being contaminated with foreign substances. In the conventional practice, it has been necessary to drain the water from the flume so as to make the turbine accessible in order to lubricate the operating mechanism for the gates of the turbine. Proper lubrication of existing turbines is therefore frequently neglected and a high degree of wear takes place on the working parts of the gate mechanism, greatly reducing its useful life.

In addition, as the parts of the gate mechanism wear, there naturally develops a greater amount of lost motion in the mechanism which detracts from the accuracy of control over the gates and thus inaccuracies of the speed of rotation of the turbine develop.

In most installations, the gate shaft is operated by a suitable speed sensitive governor through either direct connection to the gate shaft, or through the medium of a lever so that the speed of rotation is automatically held practically constant at any amount of power which the turbine is required to deliver. The amount of power which the turbine is required to produce is rarely steady for any appreciable period of time. Load demands and changes of head require the turbine gates to be oscillated back and forth in varying amounts depending upon the power being developed, between small gate opening and gates fully opened, thereby causing friction in the bearings of the gate operating mechanism. Such oscillations or movements may be comparatively small or large, or at frequent or infrequent intervals of time. The change of $\frac{1}{10}$ gate opening in a minute or so would be considered small or slow, where $\frac{9}{10}$ of the gate opening change in one second would be considered large or rapid. These operating conditions vary in different installations. It is desirable to have the turbine maintain uniform speed under all conditions and of power output and in order to facilitate these most effectively, it is essential that the bearings and the journals of all the members of the turbine gate mechanism which are in sliding contact with each other be as free as possible from friction and without unnecessary lost motion. In existing turbines where these parts are directly exposed to the water, which in most cases carries silt or abrasive substances, wearing of the gate mechanism takes place rapidly and causes lost motion resulting in inaccurate maintenance of speed of rotation.

Where the operating mechanism is not lubricated satisfactorily or not at all as in existing turbines, greater bearing clearances must be provided than in a turbine of this invention because if constructed with clearances small enough to eliminate lost motion, the bearing surfaces will rust together especially if the turbine stands idle any appreciable length of time such as occurs in certain seasons of the year when there is insufficient water to operate, or from other causes.

When an existing turbine stands idle the clearance spaces of the bearings also become filled with silt or dirt, causing the gate mechanism to work hard.

Also, it will be quite apparent that considerable force is applied upon the gates of the turbine that causes the support or pivot shafts of the gates to continuously press or wear on one side of the bearings for the shafts. The result is to cause an uneven distribution of load upon the bearing for the shafts of the gates as a result of the continual movement of the pivot shafts on one side of the bearing. As the head of water utilized by the turbine is increased, the intensity of the wear caused by the pivot shafts is, of course, increased accordingly, thereby developing unwanted lost motion in the bearings for the pivot shafts of the gates.

In this invention, the hydraulic turbine consists of a runner 10 that is keyed to a drive shaft 11 and suitably secured thereto by the bolt 12. The drive shaft 11 is suitably carried in the bearing 13 secured to the crown plate 14 by means of the bolts 15. The drive shaft 11 is connected to a suitable apparatus for transmitting power.

The turbine is provided with the gates 16 that are positioned circumferentially around the inlet chamber 17 provided for the runner 10, this chamber being formed between the crown plate 14 and the curb ring 18. The gates 16 are carried upon the pivot shafts 19 that extend between the crown plate 14 and the curb ring 18, the pivot shafts 19 being suitably operated by an operating mechanism hereinafter described, for controlling the position of the gates 16 and thereby regulate the water flow to the runner 10. The usual stay vanes 20 are provided for directing the water flow to the gates 16.

As illustrated in Figure 1, the turbine 25, heretofore described in general terms, is placed at the bottom of an open flume having the bottom wall 26, and side wall 27 and a floor 28. The water head, or water level, is indicated by the numeral 29 and is open to the atmosphere. The turbine 26 is provided with a draft tube 30 that enters the tail race 31. The drive shaft 11 of the turbine 25 extends upwardly and is adapted to drive a current generating unit 32.

In Figure 1 the water head is relatively shallow and substantially constant, whereas in the illustration in Figure 2 the water head may be of any height even though the arrangement is of the open flume type.

In the arrangement illustrated in Figure 2 the turbine 25 is illustrated as being mounted on a horizontal axis in contradistinction to the vertical axis arrangement of the turbine illustrated in Figure 1. The flume for the turbine illustrated in Figure 2 is formed by the walls 33, 34 and 35, the turbine being mounted adjacent the opening 36 provided in the wall 34. The draft tube 37 extends into the tail race 38. The drive shaft 11 of the turbine 25, as illustrated in Figure 2, extends horizontally and may be supported by a bearing 39.

Returning now to Figures 3 and 4, the gates 16 of the hydraulic turbine are controlled by a gate operating mechanism 40 that is positioned above the crown plate 14. Each of the pivot shafts 19 for the gates 16 is provided with a lever arm secured to the upper end of the pivot shaft 19 by means of a split bearing arrangement secured to the shaft 19 by the nut and bolt 41a. The lever arms 41 are each connected to the gate ring 42 by means of a link 43 pivoted to the lever arm 41 by the pivot pin 44 and to the gate ring by means of the pivot pin 45. The gate ring 42 is rotatably mounted in an annular recess 46a provided in the upper end of the crown plate 14.

Rotation of the gate ring 42 causes the link 43 and the lever arm 41 to rotate the gate shafts 19, and thus the gates 16, to regulate the opening and closing of the gates in response to a speed control mechanism, hereinafter described, to control the quantity of water entering the turbine and thus control the speed of the runner 10 in response to load requirements upon the turbine.

The gate ring 42 is rotated by means of a link 46 pivotally mounted to the gate ring 42 by the pivot pin 47, and pivotally connected to a lever arm 48 by a pivot pin 49. The lever arm 48 is secured to an operating shaft 50 that extends upwardly from the turbine 25, and upon rotation thereof causes rotation of the gate ring 42 and thus angular adjustment of the gates 16.

The operating shaft 50, as illustrated in Figures 1 and 2, extends to a point outside the flume and connects to a governor 51 that is suitably regulated in response to any deviation from the normal speed of rotation of the drive shaft 11 of the turbine 25.

As illustrated in Figure 3, the governor 51 is suitably operated from the drive shaft 11 of the turbine 25 so that it will respond directly to the speed of rotation of the turbine, and may be of the conventional centrifugal type. The governor 51 may operate a pilot 4-way valve that supplies hydraulic fluid to the opposite ends of a control cylinder 53 through the hydraulic service lines 54 and 55 so as to oscillate the lever 56 secured to the operating shaft 50. A suitable fluid pump 57 has the second side thereof connected to a supply tank 58 and the pressure line connected to the 4-way valve 52 whereby to supply either of the service lines 54 and 55 with fluid under pressure. An exhaust line connects the 4-way valve 52 with the tank 58.

The governor arrangement illustrated in Figure 8 is merely one form of a control mechanism for regulating the gate operating mechanism of the turbine to control the flow of water in the turbine.

The gate operating mechanism 40, consisting of the gate ring 42 and the various links, levers and pivots for rotating the shafts 19 for the gates 16 is located in a chamber 60 formed above the crown plate 14 by the closure plate 61 that is secured to the crown plate 14 by means of the bolts 62, and is sealed by the gasket 63 provided between the closure plate 61 and the crown plate 14. The operating shaft 50 for the gate operating mechanism, hereto referred to, extends through a boss on the closure plate 61. A seal member 65 is provided between the shaft 50 and the boss 64 to prevent leakage of fluid from within the chamber 60.

The chamber 60 provided between the closure plate 61 and the crown plate 14 is filled with lubricant of a suitable grade through the inlet tube 66. Any air within the chamber 60 is exhausted through the exhaust tube 67. The lubricant inlet tube 66 extends to the exterior of the flume so that it will be readily accessible for supplying lubricant into the lubricant chamber 60 at any time. The exhaust tube 67 also extends exteriorly of the flume.

When filling the chamber 60 with lubricant, preferably oil of 600-W grade when operating under pressure, the oil is supplied through the inlet tube 66 until the oil discharges from the top of the exhaust tube 67. This insures a complete filling of the lubricant chamber 60. By now closing a suitable valve 68 provided in the exhaust tube 67 and adding a little extra oil through the inlet tube 66, the lubricant in the chamber 60 may be placed under pressure therein, a suitable valve 69 being provided on the inlet tube to close the same when the lubricant under pressure is to be confined in the chamber 60.

In order to retain the lubricant under pressure in the chamber 60 at all times, a suitable surge chamber 70 can be provided in the inlet tube 66, as illustrated in Figure 2, whereby air under pressure in the surge chamber 70 will maintain the lubricant under pressure therein and in the lubricant chamber 60 of the turbine. A suitable inlet line and valve 71 can be provided for the surge chamber 70 to supply air under pressure into the same.

Returning now to Figure 3, it will be quite apparent that with the lubricant chamber 60 filled with lubricating oil, that all of the parts of the gate-operating mechanism will be constantly operating in a body of lubricant, and the lubricant is completely sealed from the water surrounding the turbine 25 whereby the lubricant will remain indefinitely in the chamber 60 to perform its purpose of lubricating the parts of the gate operating mechanism and cannot be worked away from the parts by movement of water around the turbine. In order to lubricate the lower bearing of the pivot shafts 19 for the gates 16, which are journaled in the curb ring 18, the pivot shafts 19 each have a passage extending longitudinally therethrough to conduct lubricant into the bearing chamber for the shafts 19 provided in the curb ring 18. Suitable pressure oil seals 73 and 74 are provided above and below the gates 16 in the crown plate and the curb ring to prevent excessive loss of oil from the chamber 60 around the shafts 19.

When the water enters the turbine 25, and thus flows against the gates 16, considerable bearing pressure is developed between the gate shafts 19 and the bearings for the same in the crown plate 14 and the curb ring 18. To balance, or at least partially balance, the force thus developed, a groove 75 is provided along one side of the gate shaft 19 in the curb ring 18 and a similar groove 76 is provided in the crown plate 14 along the gate shaft 19. The groove 76 receives lubricant under pressure through the groove 78 provided in the upper face of the crown plate 14 while the groove 75 receives lubricant under pressure from the bearing chamber 79 provided in the curb ring 18.

The grooves 75 and 76 are placed along the gate shafts 19 on the side thereof opposite to that against which the force of the water entering the turbine is applied so that the force of the lubricant under pressure tends to move the gate shafts 19 in a direction opposite to that occasioned by the force of the water applied upon the gates 16, and thereby balance this force. Also, the aforesaid location of the grooves 75 and 76 provides for maximum lubrication on the bearing side of the gate shafts 19 whereon they support the greatest load to thereby minimize the amount of wear on the shafts 19 or their associated bearings.

While the apparatus disclosed and described herein constitutes a preferable form of the invention, yet the apparatus is capable of alteration without departing from the spirit of the invention, and all modifications that fall within the scope of the appended claims are intended to be included herein.

Having thus fully described my invention, what I claim as new and desire to secure by Letters Patent is:

1. In combination, a hydraulic turbine having gate means controlling waterflow through the turbine and gate operating mechanism for controlling operation of the gate means and mounted in a flume, means forming a closed chamber around the gate operating mechanism to seal the gate operating mechanism from the water as surrounding the turbine and the enclosure, conduit means extending from the exterior of the flume in which the turbine is mounted and connected to said chamber for conducting lubricant to said chamber for filling the same, and a second conduit means connected to said chamber and extending to the exterior of the flume to exhaust any gaseous substance from said chamber to permit lubricant entering said chamber through the first-mentioned conduit to fill the chamber.

2. In combination, a hydraulic turbine mounted in a flume, gate means in said turbine for controlling waterflow through the same, shaft means for rotatably supporting said gate means, bearing means for said shaft means, a gate operating mechanism operably connected to said shaft means for rotating the gate means, means forming a closed chamber in which said gate operating mechanism is received to prevent contact thereof with water surrounding the turbine and the enclosure, passage means through said shaft means interconnecting said chamber with the bearing means for the shaft means that is remote from the chamber, means extending from the exterior of the flume in which the turbine is mounted and connected to said chamber for conducting lubricant to the chamber and place lubricant therein under pressure and thereby lubricate said gate operating mechanism and the bearing means for said shaft means, seal means adjacent the bearing means for the shaft means to prevent loss of lubricant from said chamber, and means connected to said chamber and extending to the exterior of the flume in which the turbine is mounted for exhausting gaseous substances from said chamber whereby to permit complete filling of said chamber with lubricant under pressure.

3. In combination in a hydraulic turbine, gate means in said turbine for controlling waterflow through the same, shaft means for rotatably supporting said gate means, bearing means for said shaft means, a gate operating mechanism operably connected to said shaft means for rotating the gate means, means forming a closed chamber in which said gate operating mechanism is received to prevent contact thereof with water surrounding the turbine and the chamber when mounted in a flume, passage means through said shaft means interconnecting said chamber with the bearing means for the shaft means that is remote from the chamber, port means in said chamber through which lubricant is conducted into the chamber to lubricate said gate operating mechanism and the bearing means for said shaft means, port means in said chamber for exhausting fluid from said chamber whereby to permit complete filling of said chamber with lubricant, seal means adjacent the bearing means for the shaft means to prevent loss of lubricant from said chamber, and means for holding lubricant under pressure in said chamber.

4. In combination, a hydraulic turbine mounted in a flume, gate means in said turbine for controlling waterflow through the same, shaft means for rotatably supporting said gate means, bearing means for said shaft means, a gate operating mechanism operably connected to said shaft means for rotating the gate means, means forming a closed chamber in which said gate operating mechanism is received to prevent contact thereof with water surrounding the turbine and the chamber, passage means through said shaft means interconnecting said chamber with the bearing means for the shaft means that is remote from the chamber, means extending from the exterior of the flume in which the turbine is mounted and connected to said chamber for conducting lubricant to the chamber and place lubricant therein under pressure and thereby lubricate said gate operating mechanism and the bearing means for said shaft means, seal means adjacent the bearing means for the shaft means to prevent loss of lubricant from said chamber, means connected to said chamber and extending to the exterior of the flume in which the turbine is mounted for exhausting gaseous substances from said chamber whereby to permit complete filling of said chamber with lubricant under pressure, and means for holding lubricant under pressure in said chamber.

5. In a hydraulic turbine the combination of, gate means for controlling waterflow through the turbine, shaft means rotatably supporting said gate means, bearing means for said shaft means, a gate operating mechanism operably connected to said shaft means for rotating said gate means, means forming an enclosure for said gate operating mechanism containing lubricant under pressure, passage means extending longitudinally along said shaft means between said shaft means and the bearing means for the same positioned adjacent the side of the shaft means opposite to the direction of force applied upon said gate means by water entering the turbine through the gate means, and passage means connecting said first mentioned passage means with said enclosure whereby lubricant under pressure is conducted into said first-mentioned passage means to apply the force thereof in opposite direction to that applied by the water upon said gate means.

6. In a hydraulic turbine the combination of, gate means for controlling waterflow through the turbine, shaft means rotatably supporting said gate means, bearing means for said shaft means, a gate operating mechanism operably connected to said shaft means for rotating said gate means, means forming an enclosure for said gate operating mechanism containing lubricant under pressure, and means for conducting lubricant under pressure to between said shaft means and the bearing means for the same on the side thereof against which said shaft means is forced by the action of water upon said gate means to thereby balance the same.

7. In a hydraulic turbine the combination of, gate means for controlling waterflow through the turbine, shaft means rotatably supporting said gate means, bearing means for said shaft means, and means for conducting lubricant under pressure to between said shaft means and said bearing means on the side thereof against which said shaft means is forced by the action of the water on the gate means to thereby balance the force so applied.

8. In a hydraulic turbine the combination of, gate means for controlling waterflow through the turbine, shaft means rotatably supporting said gate means, bearing means for said shaft means, means for conducting lubricant under pressure to between said shaft means and said bearing means on the side thereof against which said shaft means is forced by the action of the water on the gate means to thereby balance the force so applied, a gate operating mechanism positioned upon said turbine, means forming with the turbine an enclosure for the gate operating mechanism to receive lubricant under pressure, and means connecting said lubricant conducting means between said shaft and said bearing means with said enclosure to conduct lubricant therefrom thereto.

9. In combination, a hydraulic turbine having gate means controlling waterflow through the turbine and gate-operating mechanism for controlling operation of the gate means and adapted to be mounted in a flume, means forming a closed chamber around the gate-operating mechanism to seal the gate-operating mechanism from the water surrounding the turbine when it is mounted in a flume, port means in said chamber forming means through which lubricant is supplied to said chamber for filling the same, and a second port means in said chamber forming means through which any gaseous substance within the chamber is exhausted from the chamber to permit lubricant entering the chamber through the first-mentioned port means to fill the chamber.

10. In a hydraulic turbine adapted for mounting in a flume the combination of, gate means for controlling waterflow through the turbine and gate-operating mechanism for operating the gate means consisting of a speed ring and lever means operably connecting the speed ring to the gate means, means forming a closure enclosing said speed ring and said lever means to seal the same from water around the turbine and adapted to be filled with lubricant for lubricating said gate-operating mechanism, conduit means connected to said closure and extending therefrom to a position remotely located from said closure for conducting lubricant to said closure from a position remotely located from the closure and for exhausting fluid therefrom, and means for retaining lubricant in said chamber under pressure.

11. In a hydraulic turbine the combination of, turbine housing means, gate means positioned within said turbine housing to control waterflow therethrough, shaft means rotatably supporting said gate means in said housing, bearing means in said housing at opposite ends of said shaft means for supporting the same in said housing, a gate operating mechanism disposed on one side of said housing and operably connected to said shaft means for controlling movements of said gate means, wall means cooperating with said housing for forming a chamber to receive said mechanism and enclosing the same to prevent water around the turbine from contacting said mechanism, conduit means connected to said wall means and extending to a position remotely located from said wall means for conducting lubricant to said chamber from the remote position, a second conduit means connected to said wall means and extending to a position remotely located from said wall means for exhausting fluid from said chamber, one end of said shaft means extending into said chamber, and passage means extending through said shaft means from said one end thereof for conducting lubricant from said chamber to the end of said shaft means that is remote from said chamber for lubrication thereof.

GEORGE A. BIGGS.

REFERENCES CITED

The following references are of record in the file of this patent:

UNITED STATES PATENTS

| Number | Name | Date |
|---|---|---|
| 921,950 | Cassel | May 18, 1909 |
| 1,570,536 | Syvertsen | Jan. 19, 1926 |
| 1,957,183 | Schmitthenner | May 1, 1934 |

FOREIGN PATENTS

| Number | Country | Date |
|---|---|---|
| 88,622 | Switzerland | Sept. 1, 1921 |